Oct. 11, 1955     C. P. KRUPP     2,720,011

INFLATABLE CLOSING STRIP FOR AIRCRAFT

Filed May 11, 1951

Inventor
Carroll P. Krupp
By Dwight L. Moody
Atty.

United States Patent Office 2,720,011
Patented Oct. 11, 1955

2,720,011

INFLATABLE CLOSING STRIP FOR AIRCRAFT

Carroll P. Krupp, Cuyahoga Falls, Ohio, assignor to The B. F. Goodrich Company, New York, N. Y., a corporation of New York Application May 11, 1951, Serial No. 225,789

5 Claims. (Cl. 20—69)

The invention relates to inflatable closures for spaced-apart structures such as separable sections or parts of aircraft and other structures wherein good inflatable height and a multiple seal on the closing surface are desired.

Heretofore, plain inflated tubing which has been utilized to close the space between the canopy and the wall of an aircraft cockpit or other compartment, has provided only limited distension and line-contact sealing sometimes resulting in faulty closing.

An object of the invention is to provide an inflatable closure for aircraft and other structures capable of overcoming effectively the foregoing and other disadvantages of the prior closure construction.

Other objects of the invention are to provide an improved inflatable closing strip having provision for multiple or labyrinthian sealing against the closing surface; to provide for a tubular closure structure of the multi-seal type wherein the overall inflated or advanced height of the closure is substantially greater than the height of the inflatable tubular portion alone; to provide for a high ratio of inflated height to deflated height of the strip; to provide for a nested spaced-apart relationship of elements of the strip in the deflated condition together with inflatably moving a closing element having multiple sealing means from a position within the space provided by the nested elements to an advanced position substantially outward or upward of the strip; to provide for clearance between the sides of the closing element and the adjacent sidewalls of the strip; to provide for stability and substantial resistance to flexure of the closing element in the direction transversely of the strip; to provide for sealing along the closing element at a plurality of positions spaced-apart transversely of the strip; and to provide for simplicity and durability of construction, convenience of manufacture, and for effectiveness of operation.

These and other objects and advantages of the invention will be apparent from the following description.

In the accompanying drawings, which form a part of this specification,

Figure 3:
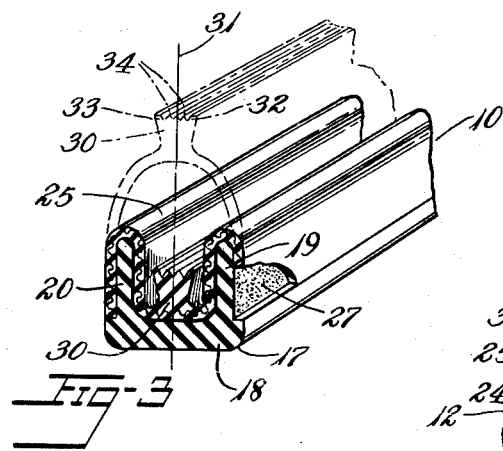
Figure 4:
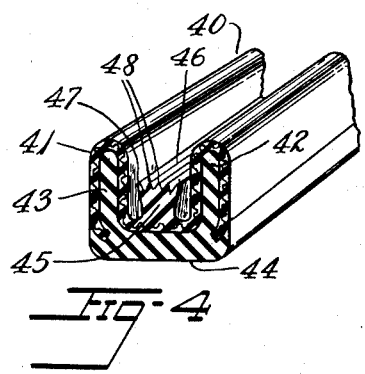

Fig. 3 is a sectional and perspective view of the inflatable endless closing strip in the uninflated condition and after molding and vulcanization but before mounting on the aircraft, parts being broken away, and the broken lines showing the strip in fully extended condition under inflation, and Fig. 4 is a view like Fig. 3 but showing a modified construction of the closing strip, parts being broken away.

Figure 1:
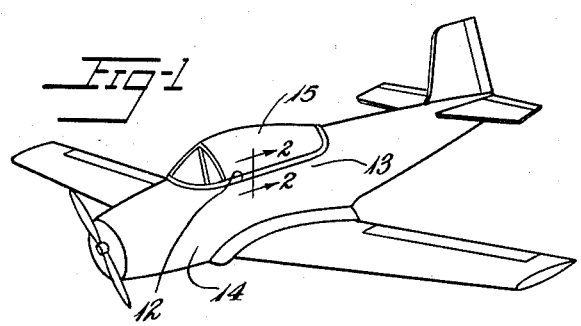
Fig. 1 shows a canopy seal of an aircraft constructed in accordance with and embodying the invention.
Figure 2:
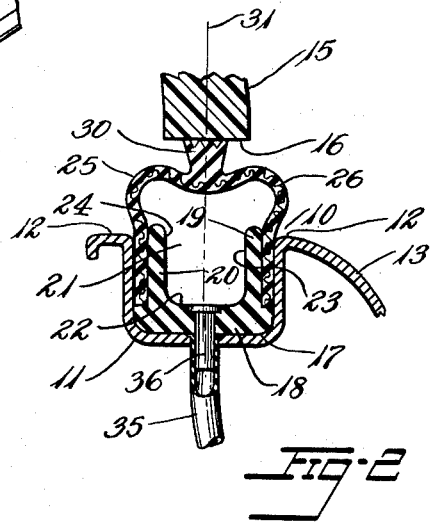
Fig. 2 is a sectional view taken along line 2—2 of Fig. 1 showing an inflatable endless closing strip of the canopy seal in the inflated, mounted condition contacting the canopy closing surface in sealing relation therewith, parts being broken away.

In the illustrative construction of the aircraft canopy closure shown in Figs. 1, 2 and 3, an inflatable endless closing or sealing strip 10 extends peripherally about and is secured, desirably adhesively as by a suitable rubber cement of the air-curing type, to a channeled support member 11 constituting the margin 12 of the cockpit of the aircraft, the strip 10 being preformed to the shape and the peripheral contour of the support member 11. The support member may be an integral part of an outer wall 13 of a fuselage 14 which supports a streamlined canopy 15 of stiff, transparent, plastic material overlying the cockpit, the canopy 15 being separably attached to the fuselage 14 by any suitable attaching means used for this purpose in aircraft construction. The canopy 15 is mounted with the peripheral edge or closing surface 16 of its wall directly and centrally overlying the channeled support member which may be of generally U-shaped construction in cross-section. The peripheral edge surface 16 which may be flat transversely of the canopy wall, is disposed in spaced-apart yet adjacent relation to the support member and is held thus for multi-sealing by the inflatable endless strip 10 in the inflated condition seating against the closing surface 16 as shown especially in Fig. 2.

The inflatable sealing strip 10 has a base element 17 of inwardly recessed construction in cross-section and desirably extruded from material such, for example, as resilient rubber, natural or synthetic, or other elastic, plastic material capable of being extruded or otherwise conveniently formed to shape in strip form and capable of withstanding weather, sunlight, ozone, extreme temperatures, oil and other deteriorating conditions encountered especially in aircraft service. The base element 17 has a bottom portion or wall 18 interconnecting upwardly projecting, laterally spaced-apart marginal portions or sidewalls 19 and 20, the bottom wall together with the upstanding sidewalls providing a longitudinal recess, groove, or channel of substantial width and depth relative to the outside dimensions of the element. The inner surfaces of the base element 17 at the channel opening or inflating space 21 may be constituted by a substantially flat base surface 22 having junctures at the sidewalls 19 and 20 with vertically-extending, parallel, substantially straight side surfaces 23, 24 merging with rounded upper edge surfaces of the sidewalls 19 and 20 for facilitating maximum peripheral extent of the surfaces 22, 23, 24 transversely of the strip.

It will be seen that the transverse configuration, width and depth dimensions of the channel opening 21 make feasible a nested disposition of a flexible distensible element 25 in an inwardly turned condition in the channel for the deflated condition of the strip, while freedom of movement of the distensible element to and from its nested disposition upon inflation and deflation of the strip is facilitated.

Although the proportions, shape, and wall thickness of the base element 17 may vary from those shown especially in Fig. 3, it is desirable that the wall shape, thickness and stiffness be sufficient to resist collapse inherently and to maintain the position of the sidewalls 19 and 20 in their spaced-apart, upstanding relation, thereby substantially maintaining the U-shape of the base element despite positioning the strip in the deflated condition at regions of compound or sharp curvature of the support member 11, and at the same time having the base element sustain to a large extent the stresses due to the mounting of the sealing strip.

The inflatable sealing strip includes the distensible element 25 which is fluid-tight and is relatively thin, stretchable, and flexible as compared to the base element 17. The distensible element 25 may be made of a suitable soft compound of resilient, natural or synthetic rubber, or both, and is desirably of composite construction having at its outer surface a thin layer of oil-resistant, synthetic rubber united with a relatively thick underlying layer of natural rubber and having united with and sandwiched between the rubber layers a reinforcement 26 of elastic fabric such, for example, as knitted or stockinette fabric of nylon, silk, cotton, glass or other suitable filamentary material. The reinforcement 26 has stretchability transversely of the strip with substantially less stretchability longitudinally of the strip to provide directional extensibility of the element 25 outwardly and upwardly away from the base element. The all-rubber layer inwardly of the reinforcement 26 is advantageous for maintaining fluid-tightness even though the outer rubber layer of the element 25 be damaged or broken in use. The reinforced construction resists breakage of the distensible element at its regions of sharp flexure, especially adjacent the rounded upper edges of the sidewalls 19 and 20, and resists blow-out of the strip.

The distensible element 25 extends transversely of the base element 17 in overlying unattached relation to the bottom and sidewall inner surfaces 22, 23, 24 and also in the overlying unattached relation to the rounded upper edges or margins of the base element 17, and is attached and bonded in overlapping relation to the sidewalls 19, 20 at their outer surfaces as by a suitable rubber cement 27, thereby providing with the base element a tubular inflatable member having the inflating space 21. It will be noted that the lateral extent or width of the element 25 between the positions of attachment to the sidewalls 19, 20 is greater than the lateral dimension or width from one of the positions of attachment directly across the mouth of the channel to the other position of attachment, so that the distensible element has slack and is normally in inwardly turned condition in the channel in substantially conforming relation to the inner surfaces 22, 23, 24 of the base element 17 in the deflated condition of the strip.

The arrangement facilitates the distension of the flexible distensible element 25 from its nested disposition in the channel of the base element 17 to a position outwardly thereof upon inflation of the strip as shown especially in Fig. 2, and facilitates the resilient return of the distensible element 25 to its nested disposition within the channel of the base element upon deflation of the strip.

For engaging the closing surface 16 of the canopy 15 in sealing relation at a plurality of three or more spaced-apart positions transversely of the strip, a flexible closing or sealing projection or element 30 of suitable resilient rubber material, desirably extruded in strip form, is bonded adhesively to the distensible element 25 so as to project vertically upward therefrom and desirably extend along the strip substantially centrally of the vertical plane at 31 passing through the longitudinal axis of the strip. The closing element 30 is receivable in the opening at the channeled, upper or outer face of the strip and positionable adjacent the bottom wall 18 when the base and distensible elements are in the normal nested, substantially conforming relation. The closing element may but need not project beyond the uppermost margins of the sides of the strip in its normal, deflated condition shown in Fig. 3; and preferably has its ridged, upper, structure-engaging face at a height above the base element and distensible element not exceeding the height of the uppermost margins of the sides of the strip in the deflated condition so as to dispose the closing element wholly in the channel and thereby protect the closing element against accidental damage.

The closing element is of sufficient width and is filleted at its bottom region of bonded attachment to the distensible element to provide good foundation and lateral stability of the closing element to resist extensive lateral shifting and flexure in the inflated condition of the strip. The sides of the closing element throughout their extent vertically and longitudinally of the strip are spaced from the adjacent sides of the strip at its channeled upper or outer face to provide clearance between the closing element 30 and the distensible element 25 in the normally retracted, nested condition shown in Fig. 2 for avoiding interference with vertical movement of the closing element from its position within the upper channel of the strip to the outward and upward position at an advanced height substantially above the tubular inflatable member formed by the base element 17 and distensible element 25 in the inflated condition, that is the inflated height of the distensible element, as shown by full lines in Fig. 2 and by broken lines in Fig. 3 so that the total increase in height of the strip in its inflated condition is substantially greater than the increase in height of the distensible element in the inflated condition of the strip. It is essential that sufficient clearance be provided for facilitating freedom of movement of the closing element to the advanced height and the distension of the distensible element and for facilitating the elastic retraction or return of the closing element and its associated distensible element to the nested arrangement and to positions within the height of the strip in its normally deflated condition shown in Fig. 2.

The closing element may be flared upwardly to provide maximum width at its upper structure-engaging face consistent with the passage of the element to and through the upper channel mouth without contacting the adjacent side surfaces of the strip during the passage.

The resilient rubber closing element 30 at its upper structure-engaging face and intermediate the opposite side margins thereof has a plurality of ridges or ribs 32, 33, 34 of resilient rubber spaced-apart transversely of the strip and extending longitudinally along the strip for resilient contact with the edge surface 16 of the canopy 15. The outermost or marginal ridges 32, 33 may be flat-topped for abutment sealing, while one or more intermediate, vertically disposed ridges 34, 34 may be tapered to sharp upper edges for effecting multiple lip-action sealing by flexure of the edges against the canopy.

In the embodiment of Figs. 2 and 3 the closing element 30 has a flat structure-engaging face with the ridges therein to conform with the flat configuration of the edge surface 16 of the canopy, but, if desired, the ridged structure-engaging face may be of a configuration other than flat to substantially conform with a configuration other than flat of the edge surface 16 to provide the multiple or labyrinthian seal along the edge surface 16.

In producing the inflatable sealing strip 10, the base element 17, the distensible element 25 and the closing element 30 are desirably in an uncured state during assembly in strip form, and after such assembly the ends are joined as by an abutment splice. Then the endless strip may be arranged in the deflated condition shown in Fig. 3, and the elements united integrally as by vulcanization under heat and pressure while disposed in a suitable mold (not shown), the contour of the mold cavity corresponding to the contour of the channeled support member 11 of the cockpit, thereby providing the desired endless integral construction and preformed configuration of the strip having the normal nested arrangement of the several elements.

However, the strip, instead of being molded in the endless construction, may if desired, be molded in continuous strip form and may be used in continuous strip form by suitably joining and sealing the end portions one to the other as by suitable rubber cement to form the endless construction at the time of mounting in the support member 11. Also, the continuous strip may be used as such by sealing the end portions through adhering the unattached intermediate portion of the distensible element to the base element at each end portion.

The inflatable endless sealing strip 10 in the cured, preformed and deflated condition is mounted on the support member 11 with the base element 17 seated in the channel of the support member and desirably adhered to such member by a suitable rubber cement. For inflating the strip 10, a suitable conduit 35 may be provided in communication with the inflating space 21 of the strip 10 through a tubular metal fitting 36 imbedded in the bottom wall 18 and through the base of the channeled support member 11 as shown especially in Fig. 2, which conduit 35 may be connected to a suitable source of air under pressure (not shown) in the aircraft.

Under inflation the distensible element 25 distends from its normally retracted condition in the channel of the strip 10 and flexes upwardly and outwardly relative to the base element 17 and tends to assume an approximately semi-circular shape in cross-section. During the inflation the closing element 30 moves simultaneously with and is lifted substantially vertically upward by the distensible element 25 from the position within the retracted height of the strip to an advanced height substantially above the inflated height of the distensible element 25 as shown especially in Fig. 3, so as to press resiliently the ridges 32, 33, 34 against the edge surface 16 in sealing relation therewith. The plurality of longitudinally-extending ridges 32, 33, 34 produce a multiple seal continuously along the canopy.

The circumferentially stretchable construction of the distensible element 25 with relatively less stretchability longitudinally of the strip, provides not only substantially uniform distension of element 25 along the strip for continuity of sealing but also upward directional stability of the distensible element under inflation, whereby the closing element is compelled to move substantially vertically of the strip with little or no lateral shifting for assuring good sealing contact with the edge surface 16 of the canopy. An effective canopy seal is maintained by the closing strip 10 even though the pressure be 5 to 10 lbs. p. s. i. and greater than the pressure in the cockpit.

Upon deflation of the strip 10, the distensible element 25 and the closing element 30, by virtue of their resiliency, flex and move downwardly toward the base element 17 and elastically resume their normal, nested disposition at the upper channel face of the strip, as shown especially in Fig. 3, thereby breaking the canopy seal. The closing element 30 returns to its normal position within the retracted height of the strip without hindrance from the adjacent sidewalls by virtue of the clearance between the closing element 30 and the sidewalls, even though the closing element occupies the major part of the upper channel of the strip.

The modified construction 40 shown in Fig. 4 is like that of the sealing strip 10 except for the attachment of the distensible element 41 at the outer surfaces of the sidewalls 42, 43 of the channel base element 44, and except for the ridged configuration of the upper structure-engaging face of the closing element 45. The distensible element 41 is adhesively attached as before to the outer surfaces of the sidewalls 42, 43; but the sidewalls are recessed so that the rubber material of the base element 44 instead of terminating at the lowermost edges of the distensible element, is folded over and upwardly beyond the lowermost edges to overlap slightly and be bonded to the lowermost marginal portions of the element 41. The arrangement provides a pocketed construction at the lowermost marginal portions of the element 41 for further assuring a secure attachment and to resist tearing the distensible element 41 loose from the base element 44 under repetitive inflation of the strip and to cover the ends of the threads of the textile reinforcement in the element 41 so as to prevent absorption of moisture by the threads through a wick action of the thread ends, which moisture tends to rot the material of the threads and thus objectionably harm the strength and stretchability of the textile reinforcement.

The resilient rubber closing element 45 provides lip-sealing action and to this end the outermost or marginal ridges 46 and 47 are of tapered construction terminating in sharp edges as shown especially in Fig. 4, and extend upwardly in oppositely inclined relation one to the other for flexure of the edges against the closing surface 16 of the canopy to effect lip-sealing at the opposite sides of the closing element. The intermediate ridges 48, 48 may be like the ridges 34, 34 of the closing element 30 for multiple lip-action sealing along the element. The ridges 46, 47, 48 like the ridges 32, 33, 34 of the closing 30 desirably terminate at the same height above the distensible element 41 when the closing surface 16 is substantially flat. If desired, the edges 46, 47, 48 may be of non-uniform height above the distensible element 41 to conform with a configuration other than flat of the surface 16.

Variations may be made without departing from the scope of the invention as it is defined in the following claims.

I claim:

1. An inflatable sealing strip for disposition between spaced-apart structures, said sealing strip comprising a base for support by one of the structures and having a continuous channel extending longitudinally along the strip, a flexible distensible element mounted on said base and extending across said channel to define therewith an inflating space, said distensible element, in the uninflated condition of the strip, having normally an inwardly turned disposition so as to lie within said channel, and a single flexible closing element mounted on and extending longitudinally continuously along a mid-portion of said distensible element and projecting outwardly away from the outer face of said distensible element and terminating remote from said outer face in an elastic structure-engaging sealing surface of said closing element, said flexible closing element being narrower than said channel and, in said uninflated condition of the strip, being disposed within said channel along with said distensible element, whereby inflation of the strip causes said distensible element to flex and distend outwardly and shift said closing element from its position within said channel to a position entirely outside said channel.

2. An inflatable sealing strip for disposition between spaced-apart structures, said sealing strip comprising a base for support by one of the structures and having sidewalls and a bottom wall forming a continuous channel extending longitudinally along the strip, a flexible distensible element mounted on said base and extending across said channel to define therewith an inflating space, said distensible element, in the uninflated condition of the strip, having normally an inwardly turned disposition so as to lie within said channel with side portions of said distensible element extending along the inside of the sidewalls of said base and an integral mid-portion of said distensible element extending along the inside of the bottom wall of said base, and a single flexible closing element mounted on and extending longitudinally continuously along said mid-portion and projecting outwardly away from the outer face of said distensible element and terminating remote from said outer face in an elastic structure-engaging sealing surface for sealing contact with the other structure, said flexible closing element being narrower than said channel and, in said uninflated condition of the strip, being disposed within said channel along with said distensible element, whereby inflation of the strip causes said distensible element to flex and distend outwardly and shift said closing element from its position within said channel to a position entirely outside said channel.

3. An inflatable sealing strip for disposition between spaced-apart structures, said sealing strip comprising a base for support by one of the structures and having a continuous channel extending longitudinally along the strip, a flexible distensible element mounted on said base and extending across said channel to define therewith an inflating space, said distensible element, in the uninflated condition of the strip, having normally an inwardly turned disposition so as to lie within said channel with a mid-portion of the element at the region of the bottom of said channel, and a single flexible closing element mounted on and extending longitudinally continuously along said mid-portion and projecting outwardly away from the outer face of said distensible element and terminating remote from said outer face in an elastic structure-engaging sealing surface with a transverse extent sufficient to permit stable opposition to the opposing other structure, said closing element occupying the major part of the width of said mid-portion and having an overall width less than that of the mouth of said channel and, in the said uninflated condition of the strip, being disposed within said channel along with said distensible element, whereby inflation of the strip causes said distensible element to flex and distend outwardly and shift said closing element from its position within said channel to a position entirely outside said channel.

4. An inflatable sealing strip for disposition between spaced-apart structures, said sealing strip comprising a base for support by one of the structures and having sidewalls and a bottom wall forming a continuous channel extending lonigtudinally along the strip, a flexible distensible element mounted on said base and extending across said channel to define therewith an inflating space, said distensible element, in the uninflated condition of the strip, having normally an inwardly turned disposition so as to lie within said channel with side portions of said distensible element extending conformingly along the inside of the sidewalls of said base and an integral mid-portion of said distensible element extending conformingly along the inside of the bottom wall of said base, and a single flexible closing element mounted on and extending longitudinally continuously along said mid-portion and projecting outwardly away from the outer face of said distensible element and terminating remote from said outer face in an elastic structure-engaging surface having a plurality of continuous sealing ribs therein extending lonigtudinally along the strip for sealing contact with the other structure, said flexible closing element being narrower and of lesser height than said channel and, in said uninflated condition of the strip, being disposed entirely within said channel along with said distensible element, whereby inflation of the strip causes said distensible element to flex and distend outwardly and shift said closing element from its position within said channel to a position entirely outside said channel.

5. An inflatable sealing strip for disposition between spaced-apart structures, said sealing strip comprising a base of flexible rubber-like material for support by one of the structures and having a single continuous channel extending longitudinally along the strip, a flexible distensible element comprising thin, highly flexible, air-impervious rubber-like material mounted on said base and extending across said channel and sealingly joined to the two sides of said base outside of said channel to define with the channel an inflating space, said distensible element, in the uninflated condition of the strip, having normally an inwardly turned disposition so as to lie within said channel, a single flexible closing element of resilient rubber-like material mounted on and extending longitudinally continuously along a mid-portion of said distensible element and projecting outwardly away from the outer face of said distensible element and terminating remote from said outer face in a surface generally paralleling the surface of the opposing other structure and having longitudinally-extending continuous sealing means therein of said resilient rubber-like material for sealing contact with the other structure, said closing element being narrower than said channel and, in said uninflated condition of the strip, being disposed within said channel along with said distensible element, and means for inflating said strip, inflation of said strip causing said distensible element to flex and distend outwardly and shift said flexible closing element from its position within said channel to a position entirely outside of said channel without stretching of said material of said distensible element.

References Cited in the file of this patent

UNITED STATES PATENTS

| | | |
|---|---|---|
| 2,263,831 | Welch | Nov. 25, 1941 |
| 2,301,963 | Marple et al. | Nov. 17, 1942 |
| 2,371,586 | Schwartz | Mar. 13, 1945 |
| 2,699,580 | Smith | Jan. 18, 1955 |